US00RE50084E

(19) United States
(12) Reissued Patent
Ford et al.

(10) Patent Number: US RE50,084 E
(45) **Date of Reissued Patent: *Aug. 20, 2024**

(54) PERFORMANCE ENHANCING ADDITIVES FOR FIBER FORMATION AND POLYSULFONE FIBERS

(71) Applicant: Fresenius Medical Care Holdings, Inc., Waltham, MA (US)

(72) Inventors: Cheryl Ford, Kissimmee, FL (US); Jiunn Teo, Pleasant View, UT (US); Leslie Schmidt, Layton, UT (US)

(73) Assignee: FRESENIUS MEDICAL CARE HOLDINGS, INC., Waltham, MA (US)

( * ) Notice: This patent is subject to a terminal disclaimer.

(21) Appl. No.: 17/371,140

(22) Filed: Jul. 9, 2021

Related U.S. Patent Documents

Reissue of:
(64) Patent No.: 9,617,421
Issued: Apr. 11, 2017
Appl. No.: 13/981,092
PCT Filed: Feb. 3, 2012
PCT No.: PCT/US2012/023744
§ 371 (c)(1),
(2) Date: Sep. 5, 2013
PCT Pub. No.: WO2012/106583
PCT Pub. Date: Aug. 9, 2012

U.S. Applications:
(63) Continuation of application No. 16/233,712, filed on Dec. 27, 2018, now Pat. No. Re. 48,703, which is an application for the reissue of Pat. No. 9,617,421.

(60) Provisional application No. 61/439,396, filed on Feb. 4, 2011.

(51) Int. Cl.

| | |
|---|---|
| ***C08L 81/06*** | (2006.01) |
| ***B01D 63/02*** | (2006.01) |
| ***B01D 69/02*** | (2006.01) |
| ***B01D 69/08*** | (2006.01) |
| ***B01D 71/44*** | (2006.01) |
| ***B01D 71/68*** | (2006.01) |
| ***B29D 99/00*** | (2010.01) |
| ***D01D 5/24*** | (2006.01) |
| ***D01F 6/66*** | (2006.01) |

(52) U.S. Cl.
CPC ..... *C08L 81/06* (2013.01); *B01D 63/02* (2013.01); *B01D 69/02* (2013.01); *B01D 69/087* (2013.01); *B01D 71/44* (2013.01); *B01D 71/68* (2013.01); *B29D 99/0078* (2013.01); *D01D 5/24* (2013.01); *D01F 6/66* (2013.01); *B01D 2323/12* (2013.01); *B01D 2325/20* (2013.01)

(58) Field of Classification Search
CPC ..... C08L 81/06; B01D 71/52
See application file for complete search history.

(56) References Cited

U.S. PATENT DOCUMENTS

| | | | | |
|---|---|---|---|---|
| 3,691,068 | A | 9/1972 | Cross | |
| 4,051,300 | A * | 9/1977 | Klein et al. | 428/398 |
| 4,181,606 | A | 1/1980 | Carden, Jr. et al. | |
| 4,274,965 | A | 6/1981 | Carden, Jr. et al. | |
| 4,385,017 | A | 5/1983 | Joh et al. | |
| 4,439,322 | A | 3/1984 | Sonoda et al. | |
| 4,454,085 | A | 6/1984 | Schindler et al. | |
| 4,481,260 | A | 11/1984 | Nohmi | |
| 4,562,231 | A * | 12/1985 | Dean | 525/189 |
| 4,720,343 | A | 1/1988 | Walch et al. | |
| 4,906,375 | A | 3/1990 | Heilmann | |
| 5,049,276 | A | 9/1991 | Sasaki | |
| 5,086,130 | A * | 2/1992 | Dickinson et al. | 525/537 |
| 5,340,480 | A | 8/1994 | Kawata et al. | |
| 5,527,467 | A | 6/1996 | Ofsthun et al. | |
| 5,536,408 | A * | 7/1996 | Wagener et al. | 210/490 |
| 5,762,798 | A | 6/1998 | Wenthold et al. | |
| 5,859,175 | A | 1/1999 | Blatter et al. | |
| 6,001,288 | A | 12/1999 | Saruhashi et al. | |
| 6,017,474 | A | 1/2000 | Teo et al. | |
| 6,103,117 | A | 8/2000 | Shimagaki et al. | |
| 6,228,262 | B1 | 5/2001 | Shin et al. | |
| 6,284,137 | B1 * | 9/2001 | Hajikano et al. | 210/500.41 |
| 6,355,730 | B1 | 3/2002 | Kozawa et al. | |
| 6,432,309 | B1 | 8/2002 | Fuke et al. | |
| 6,596,167 | B2 | 7/2003 | Ji et al. | |
| 6,605,218 | B2 | 8/2003 | Kozawa et al. | |
| 6,802,971 | B2 | 10/2004 | Gorsuch et al. | |
| 6,890,436 | B2 | 5/2005 | Komatsu et al. | |
| 6,960,297 | B2 | 11/2005 | Kozawa et al. | |
| 7,195,711 | B2 | 3/2007 | Gorsuch et al. | |
| 7,585,412 | B2 | 9/2009 | Gorsuch et al. | |

(Continued)

FOREIGN PATENT DOCUMENTS

| | | |
|---|---|---|
| CN | 1220183 A | 6/1999 |
| CN | 1305865 A | 8/2001 |

(Continued)

OTHER PUBLICATIONS

Office Action issued in corresponding Chinese Patent Application No. 201910220561.5 dated Apr. 19, 2021 (with partial English translation)(12 pages).

(Continued)

*Primary Examiner* — Timothy J. Kugel

(74) *Attorney, Agent, or Firm* — Kilyk & Bowersox, P.L.L.C.

(57) ABSTRACT

The present invention relates to the use of additives in processes to form polymeric fibers. These fibers can be formed into membranes with improved middle and/or higher molecular weight solute removal.

45 Claims, No Drawings

(56) References Cited

U.S. PATENT DOCUMENTS

| | | | | |
|---|---|---|---|---|
| RE48,703 | E * | 8/2021 | Ford | D01F 6/66 |
| 2001/0047959 | A1 | 12/2001 | Oishi et al. | |
| 2007/0080108 | A1 | 4/2007 | Kuroda et al. | |
| 2007/0163949 | A1* | 7/2007 | Wechs et al. | 210/500.23 |
| 2007/0199891 | A1* | 8/2007 | Mabuchi et al. | 210/500.23 |
| 2008/0000828 | A1 | 1/2008 | Wechs et al. | |
| 2008/0210624 | A1 | 9/2008 | Li et al. | |
| 2008/0237127 | A1 | 10/2008 | Okafuji et al. | |
| 2009/0057225 | A1 | 3/2009 | Krause et al. | |
| 2009/0110900 | A1 | 4/2009 | Yokota et al. | |
| 2010/0294714 | A1 | 11/2010 | Buck et al. | |
| 2011/0210067 | A1 | 9/2011 | Kato et al. | |

FOREIGN PATENT DOCUMENTS

| | | | |
|---|---|---|---|
| CN | 1921929 | A | 2/2007 |
| CN | 101108314 | A | 1/2008 |
| CN | 101209396 | A | 7/2008 |
| DE | 19817364 | | 7/1999 |
| EP | 0082433 | A2 | 6/1983 |
| EP | 0750936 | A1 | 1/1997 |
| EP | 1875957 | A1 | 1/2008 |
| EP | 2042230 | A1 | 4/2009 |
| EP | 2253368 | A1 | 11/2010 |
| EP | 2253369 | A1 | 11/2010 |
| JP | 61-238306 | | 10/1986 |
| JP | 63-097666 | | 4/1988 |
| JP | 04-227827 | | 8/1992 |
| JP | H07-251049 | A | 10/1995 |
| JP | H10-216488 | A | 8/1998 |
| JP | 2003-290638 | A | 10/2003 |
| JP | 2004-105804 | A | 4/2004 |
| WO | 9515809 | | 6/1995 |
| WO | 2004096418 | A1 | 11/2004 |
| WO | 2010133612 | A1 | 11/2010 |

OTHER PUBLICATIONS

Kopec et al., "Tailoring the surface of an ultrafiltration hollow fiber by addition of a polyanion to the coagulation bore liquid," Journal of Membrane Science, 2011, vol. 369, pp. 59-67.

Kowa American Corporation, Excipients for Transdermal Patches, Pitzcol PVP Grades, 2003, retrieved on Jan. 27, 2015 from internet: www.chemical.kowa.com/asp/product/excipients, 2003, 2 pages.

Labadie et al., "Poly(aryl ether) Synthesis," American Chemical Society, ACS Symposium Series, 1996, vol. 624, Chapter 12 (pp. 210-225) Abstract only, retrieved on Oct. 26, 2015 from internet: http://pubs.acs.org/doi/abs/10.1021/bk-1996-0624.ch012, 2 pages.

Office Action issued in corresponding Chinese Patent Application No. 202010418599.6 dated Oct. 11, 2021 (with English translation)(12 pages).

Office Action received in corresponding Japanese Patent Application No. 2015-232648 dated Aug. 16, 2016 with English translation (4 pages).

Extended European Search Report issued in corresponding European Patent Application No. 19152559.1 dated Jun. 27, 2019 (8 pages).

Machine translated English equivalent of JP 2004105804 (Apr. 2004, 11 pages).*

Machine translated English language equivalent of JP 2003-290638 (Oct. 2003, 5 pages).*

International Search Report and Written Opinion of the International Searching Authority issued in corresponding International Patent Application No. PCT/US2012/023744 dated Jan. 28, 2013 (23 pages).

Database WPI Week 200510, Thomson Scientific, London, GB, AN 2005-090899 XP002690632 (3 pages).

* cited by examiner

PERFORMANCE ENHANCING ADDITIVES FOR FIBER FORMATION AND POLYSULFONE FIBERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application *currently being filed is a reissue continuation application, meaning it is a continuation of parent Reissue patent application Ser. No. 16/233,712 filed Dec. 27, 2018, and is also a reissue of U.S. Pat. No. 9,617,421 issued on Apr. 11, 2017, and further Reissue patent application Ser. No. 16/233,712 is a reissue of U.S. Pat. No. 9,617,421 issued on Apr. 11, 2017, which was filed as U.S. patent application Ser. No. 13/981,092 and* is a National Stage Application of PCT/US2012/023744, filed Feb. 3, 2012, which claims the benefit under 35 U.S.C. § 119(e) of prior U.S. Provisional Patent Application No. 61/439,396, filed Feb. 4, 2011, which is incorporated in its entirety by reference herein.

*More than one reissue application has been filed for the reissue of U.S. Pat. No. 9,617,421. The reissue applications are: U.S. patent application Ser. No. 17/371,140 (the present application), and U.S. patent application Ser. No. 16/233,712 filed Dec. 27, 2018, now U.S. Pat. No. RE48,703 E.*

BACKGROUND OF THE INVENTION

The present invention relates to fibers, such as hollow fibers, which can be useful as dialysis membrane fibers, as well as methods and materials for manufacturing the same. Existing hollow fibers have unsatisfactory sieving curves for middle molecule removal. In the case of dialysis, the molecular weight of uremic toxins can vary over a large range. Most dialysis fibers can remove only solutes at the low end of the molecular weight spectrum. The failure of these existing dialysis products to remove larger uremic solutes from the blood can compromise the health of dialysis patients.

In addition, current polysulfone fibers are made with several types of polyvinylpyrrolidone and thus the resulting fiber can contain several types of polyvinylpyrrolidone (PVP). Several molecular weight types can be used, such as one or more low molecular weight PVPs with one or more high molecular weight PVPs. This can be a complicated formulation to work with and can cause inconsistency in product performance.

Accordingly, a need exists for fibers that can be formed into dialysis membranes with better middle and higher molecular weight solute removal. A further need exist for simplifying the formulation for PVP content in fiber formulations.

SUMMARY OF THE PRESENT INVENTION

A feature of the present invention is to provide one or more additives that can at least partially replace one or more conventional components used to make hollow fibers.

A further feature of the present invention is to manipulate the formation of hollow fibers to sharpen the sieving curve for improved middle molecule removal.

An additional feature of the present invention is to provide hollow fibers, which can at least partially remove larger uremic solutes from a patient's fluids, such as blood.

A further feature of the present invention is to provide one or more different additives that can fully or partially replace a polymer, such as PVP, in a spin mass and/or serve as an additive.

An additional feature of the present invention is to provide one or more additives in a bore fluid and/or spin mass to change fiber properties.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method of spinning a fiber, such as a polysulfone-based fiber, including the steps of providing a spin mass containing a polymer (e.g., polysulfone) and at least one solvent; providing a bore fluid; combining the spin mass and bore fluid to form a polymer fiber (e.g., a polysulfone-based fiber), wherein the spin mass and/or the bore fluid contains at least one additive. The spin mass can have less than about 10 wt % low molecular weight (MW) PVP by weight of the spin mass. The bore fluid can have less than about 10 wt % low MW PVP by weight of the bore fluid. The low MW PVP can have a weight average molecular weight of less than 100 kDa or a K value of K36 or lower. The additive(s) can be in the spin mass, the bore fluid, or both.

The present invention also relates to a method of spinning a fiber, such as a polysulfone-based fiber, including the steps of providing a spin mass containing a polymer (e.g., polysulfone) and at least one solvent; providing a bore fluid; combining the spin mass and bore fluid to form a polymer fiber (e.g., a polysulfone fiber), wherein the spin mass and/or the bore fluid contains at least one additive. The spin mass can have less than about 10 wt % high and/or low molecular weight (MW) PVP by weight of the spin mass. The bore fluid can have less than about 10 wt % high and/or low MW PVP by weight of the bore fluid. The low MW PVP can have a weight average molecular weight of less than 100 kDa or a K value of K36 or lower. The high MW PVP can have a weight average molecular weight of more than 900 kDa or a K value of K80 or higher. The additive can be in the spin mass, the bore fluid, or both.

The present invention also relates to a polyarylether polymer fiber (e.g., a sulfone polymer fiber like a polysulfone fiber), which can be produced by a method of the present invention. The polymer fiber of the present invention can have a zeta potential (or streaming potential) of from about −500 mV to about 500 mV. The polymer fiber of the present invention can have an ultrafiltration constant ($K_{UF}$) of from about 1 ml/hr*mmHg to about 1000 ml/hr*mmHg in a 1 $m^2$ membrane. The polymer fiber of the present invention can have an albumin sieving coefficient of less than 20%, and/or a vitamin $B_{12}$ clearance rate of from about 1 ml/min of vitamin $B_{12}$ to about 800 ml/min of vitamin $B_{12}$, and/or a creatinine clearance rate of from about 1 ml/min of creatinine to about 800 ml/min of creatinine, and/or a sodium clearance rate of from about 1 ml/min of sodium to about 800 ml/min of sodium, and/or a beta-2-microglobulin clearance rate of from about 1 ml/min of beta-2-microglobulin to about 800 ml/min of beta-2-microglobulin, and/or a middle molecule (lysozyme) clearance rate of from about 1 ml/min of lysozyme to about 800 ml/min of lysozyme. These clearances are in aqueous solutions. Clearance can be as high as the inlet flow. For example, the maximum (normal) blood flow for a patient can be from about 450 (200) ml/min to about 500 ml/min. For instance, the polymer fiber of the present invention can have an albumin sieving coefficient less than about 20% and clearance rate less than 100% of the blood side flow rate. The polymer fiber of the present invention can have the following fiber geometry: an outside diameter of from about 100 μm to about 0.5 mm, an interior diameter of from about 100 μm to less than 0.5 mm, a wall thickness of from about 0.001 μm to about 250 μm, and a length of from about 1 cm to about 1 m. For example, the fiber can have an outside diameter of 420 μm, and a length of at least 10 cm. The polymer fiber of the present invention can have a tensile strength of from about 0.1 to 10 MPa. The fiber can have one or more of these properties.

The present invention further relates to a polyarylether polymer fiber (e.g., a sulfone polymer fiber like a polysulfone fiber) having at least one polyarylether polymer (e.g., a sulfone polymer like a polysulfone) and at least one polyvinylpyrrolidone (PVP), wherein the at least one PVP comprising at least one medium weight PVP having a K value of from 40 to 55 or from 45 to 55, or a narrower range or a single K value in this range. The polyarylether polymer fiber can have low or no low molecular weight PVP and/or can have low to no high molecular weight PVP. The polyarylether polymer fiber can have one or more of the properties identified above and/or mentioned in this description.

The present invention, in addition, provides for the fabrication of fiber to take advantage of internal filtration or convective flow generated in a hemodialyzer. By increasing middle molecule clearance through internal filtration, the high flux dialysis (HFD) treatment can be equivalent to the hemodiafiltration (HDF). To take advantage of internal filtration, fibers with a sharp sieving curve are employed, that is, a high sieving coefficient for molecules of molecular weight of about 65 kDa or less while maintaining a sieving coefficient of 1% or less for proteins with molecular weights greater than about 65 kDa, for example, albumin with a molecular weight of 67,000 Da. The present invention can accomplish this goal and others by adding one or more additives to the spin mass, the bore fluid, or both.

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to novel polymeric fibers (e.g., polyarylether polymer fibers such as sulfone polymer fibers like polysulfone fibers) and to methods to form polymeric fibers (e.g., hollow fibers). The polymeric fibers can be useful in dialyzers as membranes that contain the fibers. The present invention can involve utilizing one or more additives, which are not typically used in fiber formation processes, in spin mass formulations and/or in bore fluids. The additives, when present in effective amounts, can have the ability to affect (or alter) the characteristics/properties of the polymeric fiber, such as to accomplish one or more of the following properties (compared to the same polymeric fiber but made without the "additive" present):

a) sharpen the sieving curve for improved middle molecule removal, such as in dialyzers;

b) remove larger uremic solutes from fluids, such as blood;

c) improve middle molecule removal without a substantial increase in albumin leakage;

d) fully or partially replace PVP (e.g., one or more MW classes or types of PVP) or a similar minority polymeric component present in a spin mass, and still obtain the same or similar properties for the produced fiber; and/or e) one or more other characteristics/properties mentioned below.

The polymeric fibers of the present invention can be formed into membranes.

The present invention is especially useful where the polymeric fiber is a polyarylether polymer(s) fiber, such as a sulfone polymer fiber, like a polysulfone fiber. For purposes of the present invention, a "polysulfone based fiber" can be considered a polysulfone fiber. The present invention can be especially useful where the solvent used in the spin mass is or contains DMAC. The present invention is especially useful where only one PVP (e.g., one homogeneous PVP having a weight average MW, for instance, a medium MW PVP) is present in the spin mass, but it is understood that more than one type of PVP can be used, as an option. The present invention can be useful with forming a sponge structure for the fiber.

The one or more additives used in the spin mass and/or bore fluid can be any additive that meets the above mentioned criteria a) through e) (one or more of the criteria) and/or the additives can be one or more of the following for the spin mass and/or bore fluid:

| Spin Mass Additives | Bore Fluid Additives |
|---|---|
| Divalent Salt(s)<br>Nitrogen containing polymer(s)<br>Low MW compound(s) (e.g., wt. avg. MW of less than about 100 kDa, 10 kDa, 1 kDa, or 100 Da)<br>Hydrophilic nitrogen containing polymer(s)<br>Glycerin(s)<br>Surfactant(s) (e.g., Pluronic surfactants, PLURONIC 108)<br>Polyethylene glycol<br>Ethylene oxide/propylene block copolymer(s) | Divalent Salt(s)<br>Surfactant(s) (e.g., Pluronic surfactants, PLURONIC 108, Aerosol OT)<br>Polyelectrolyte(s) or electrolyte(s) (e.g., GAFQUAT440)<br>Hydrophilic polymer(s)<br>PVP(s) (e.g., low MW, medium MW, and/or high MW)<br>PEI |

More specific examples include, but are not limited to, vinylpyrrolidone/vinylacetate copolymer(s), vinylcaprolactam/vinylpyrolidone-dimethylamino-propylmethylacrylamide terpolymer(s), polyethylene glycol polyester copolymer(s), sodium chloride, calcium chloride, magnesium chloride, or poly(ethyleneimine) (PEI), or any combinations. The low MW compounds mentioned above in the list for spin mass additives are non-PVP compounds.

Any combination or mixture of additives can be used. An additive(s), different or the same, can be present in the spin mass and bore fluid.

The additive used in the present invention can act as a partial or complete replacement for a PVP component in conventional processes. Thus, the additive of the present invention can be optionally considered a PVP replacement component. The PVP replacement component can be a low MW PVP replacement component, a medium MW PVP replacement component, and/or a high MW PVP replacement component, or any combination thereof. Accordingly, the present invention, as one example, has the ability to reduce or eliminate low MW PVP, medium MW PVP, and/or high MW PVP, or any combination thereof in such processes.

As provided in more detail herein, the additive(s) of the present invention can be one or more PVPs. In the present invention, it has been discovered that a polymeric fiber can be made with a medium MW PVP as the primary PVP component or sole PVP component. In other words, in the method as well as the resulting fiber, a certain amount of PVP is used or is present, and as one option in the present invention, the primary (e.g., 50 wt % or more of the total PVP content) is one or more medium MW PVPs, such as one or more PVPs having a K value of from K37 to K79, or from K40 to K70, or from K45 to K65, or from K45 to K55, and the like. It has been discovered that this PVP additive can achieve a partial or complete replacement of other PVP components (such as low and/or high MW PVP), and it is possible to achieve comparable if not improved one or more properties as mentioned herein. This can be especially accomplished where very low amounts of water are present in the spin mass, such as 4 wt % or less, 3.5 wt % or less, 3 wt % or less, 2.5 wt % or less; 2.0 wt % or less, 1.5 wt % or less, such as 0.1 wt % to 4 wt %, based on the weight of the spin mass. It is noted that K values can be considered, for purposes of the present invention, to be a better characterization of the PVP instead of Daltons.

Examples of various amounts of each component are described below.

With regard to the spin mass, formulations for the present invention can be:

- polymer (e.g., a polyarylether polymer, a sulfone polymer fiber like polysulfone)—from about 10 wt % to about 30 wt % or other amounts;
- solvent (e.g., organic solvent, such as DMAC)—from about 70 wt % to about 90 wt % or other amounts;
- additive(s) of the present invention (other than PVP)—from 0 wt % to about 10 wt % or other amounts;
- water—0 wt % to 4 wt % (e.g., 0.01 wt % to 4 wt %, 0.1 wt % to 3 wt %, 0.5 wt % to 2.5 wt %, or other amounts);
- PVP (low MW)—from 0 wt % to about 10 wt % or other amounts;
- PVP (medium MW)—from 0 wt % to about 10 wt % or other amounts;
- PVP (high MW)—from 0 wt % to about 10 wt % or other amounts.
- [Total PVP present—can be from about 0 wt % to about 25 wt %, such as 8 wt % or higher; or 1 wt % to 8 wt %; or from about 4 wt % to about 6 wt %.]. Weight percents are based on the weight of the spin mass.

The polymer, such as the polysulfone, can be dissolved in the DMAC or other organic solvent.

With respect to the bore fluid, the bore fluid of the present invention can be an aqueous solvent or an organic solvent or a mixture thereof. For instance, the bore fluid can be or contain the following components:

- aqueous solvent (e.g., water)—0 wt % to 100 wt % or from about 10 wt % to about 100 wt %;
- organic solvent (e.g., DMAC, NMP, alcohol, non-polar organics)—0 wt % to 100 wt % or from about 10 wt % to about 90 wt %; and
- additive(s) of the present invention (which can be or include one or more types of PVP) 0 wt % to about 10 wt % or other amounts.

For example the bore fluid can contain the following components:

- aqueous solvent (e.g., water)—about 38 wt % to about 55 wt %;
- organic solvent—about 36 wt % to about 62 wt %; and
- additive(s) of the present invention—0 wt % to about 10 wt %.

The weight percent (unless stated otherwise) with regard to the spin mass is based upon the total weight percent of the spin mass, and the weight percent with regard to the bore fluid is with regard to the total weight percent of the bore fluid.

The additive(s) used in the spin mass and/or bore fluid can be present in an amount of from about 0 wt % to 10 wt % or more, such as from 0.001 wt % to 10 wt %, from 0.01 wt % to 10 wt %, from 0.1 wt % to 10 wt %, from 1 wt % to 10 wt %, from 2 wt % to 10 wt %, from 0.001 wt % to 0.25 wt %, from 0.1 wt % to 1 wt %, based on either the total weight of the spin mass or total weight of the bore fluid that contains the additive(s).

The polymer present in the spin mass and ultimately the polymeric fiber can be one or more polyarylether polymers, for example, sulfone polymers. Sulfone polymers include the diphenylsulfone group of the following formula I:

I

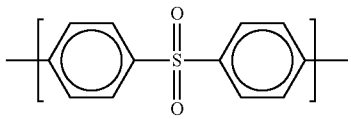

The sulfone polymers produced by the processes of the present invention can be, for example, a polysulfone, polyethersulfone, polyarylsulfone, or any combinations thereof.

Polysulfone, also referred to as polybisphenolsulfone, can have the repeat unit of the following formula II:

II

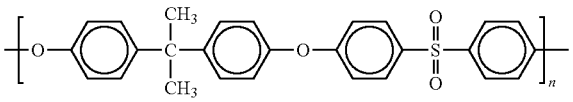

Polyethersulfone can have the following repeat unit of the following formula III:

III

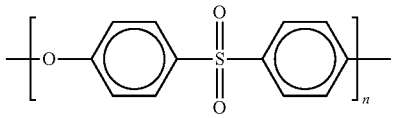

The polysulfones can be constituted, for example, by units of the formulae II alone, III alone, or both (i.e., copolymers thereof). The phenyl groups in these formulae II and III independently can be non-substituted or substituted. If substituted, the phenyl groups can, for example, have 1-4 substituents which are independently selected from hydrogen, $C_1$ to $C_6$ alkyl, or $C_4$ to $C_8$ cycloalkyl. The polysulfones have no substituents on the phenyl groups in compounds of one particular embodiment of the present invention. For homopolymers comprising units of formula II or formula III, or copolymers including both repeat units, n, m, or both can be selected to provide a polymer having any of the above indicated weight average molecular weights for the polyarylether products. These polysulfones may be used separately or as blends.

Other polyarylsulfone polymers that can be provided by the present invention comprise, for example, units of formula I and at least one of the following formulae IV and V:

IV

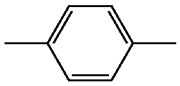

V

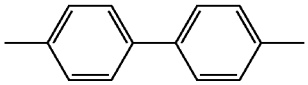

where the units I, IV and/or V can be attached to each other by an ether linkage (—P— bond), and the phenyl groups in these formulas independently can be non-substituted or substituted with the indicated substituents. As an option, the polyarylsulfones have no substituents on the phenyl groups. The polymers comprising units of formula I and at least one of formulas IV and V can be random or ordered.

A particular example of the methods to form polymeric fibers with the presence of additives, which can be performance-enhancing additives in fiber formation, is described below.

A method of spinning a polymeric fiber, such as a polyarylether polymer fiber (e.g., a sulfone polymer fiber like a polysulfone fiber), can include providing a spin mass that includes at least one polyarylether polymer (e.g., a sulfone polymer(s) like a polysulfone) and at least one solvent (e.g., organic solvent) and providing a bore fluid that contains at least one solvent (e.g., at least one aqueous solvent and/or at least one organic solvent). The method further includes combining the spin mass and bore fluid to form a polymeric fiber, such as a polyarylether polymer fiber (e.g., a sulfone polymer fiber like a polysulfone fiber).

Methods for directly making hollow fibers from the spin mass and bore fluid include spinning methods. The spinning methods can be for, example, wet spinning or dry spinning methods.

In wet spinning hollow fibers, for example, the polymer-fiber forming substances are pre-dissolved or dissolved in solvent to provide a casting solution that can be spun through a ring duct of a spinneret having an external ring duct that can contain the spin mass and a hollow core through which a precipitating solution (bore fluid) is simultaneously fed, and the solutions are cast into an aqueous bath separated from the spinneret by an air gap where precipitation of fiber components occurs. A substantial portion of the solvents can be dissolved and washed out of the fibers formed, and the fibers can be collected, dried, and cut to desired lengths. In dry spinning, instead of precipitating the polymer by phase inversion, solidification is achieved by evaporating the solvent in a stream of air or inert gas.

The spin mass can have a viscosity, for example, of from about 500 to 10,000 cps or higher and more specifically 1,000 to 2,500 cps (centipoise) at about 25° C. or at about room temperature. These viscosity values can be measured with a standard rotary viscosity measuring instrument, such as a Haake instrument. The casting solution can be freed of undissolved particles, if present, by filtering it, and can then be supplied to an extrusion or wet-spinning spinneret.

A wet-spinning spinneret that can be used for spinning hollow fibers of the present invention can be of any appropriate type, for example, shown in U.S. Pat. Nos. 3,691,068; 4,906,375; and 4,051,300, all of which are incorporated in their entireties by reference herein. The indicated casting solution can be pumped to an annular extrusion spinneret having concentric tubes. For example, the outer diameter orifice can be from about 0.3 mm to 0.5 mm and the inner diameter can be from about 0.2 mm to about 0.4 mm, or other suitable sizes. The casting solution can be supplied to the spinneret simultaneously with a precipitating solution (bore fluid) to form a spinning composition.

The spinneret or nozzle, for example, can have a ring duct with a diameter equaling or approximating the desired outer diameter of the hollow fiber. A spinneret hollow core can typically project coaxially into and through this duct through which the precipitating solution is fed simultaneous with casting solution being fed between the outer surface of the hollow core and inner bore of the ring duct. In this respect, the outer diameter of the hollow core can generally be equal to or approximate the desired inner diameter of the hollow fiber, that is to say, the lumen diameter thereof. The precipitating solution (bore fluid) can be pumped through this hollow core so that the precipitating solution emerges from the core tip and makes contact with the hollow fiber configuration that is made up of the extruded casting solution (spin mass). The precipitating solution can initiate the precipitation of the fiber building polymer in the casting solution (polymer solution).

The amount or ratio of the precipitating solution supplied to the casting solution in the spinneret can be dependent, for example, on the dimensions of the wet-spinning spinneret, and accordingly, the dimensions of the finished hollow fiber. Upon precipitation, as an option, the dimensions of the fiber are not changed to be different from those of the hollow fiber configuration before precipitation but after extrusion. For this purpose, the ratios of the volumes used of precipitating solution to polymer solution can be in a range, for example, of from about 1:0.5 to about 1:5, with such volumetric ratios being equal, for an equal exit speed of the precipitating solution and of the casting solution, to the area ratios of the hollow fiber, i.e. the ring-area formed by the polymeric substance and the area of the fiber lumen. The precipitating solution can be supplied to the extruded configuration directly upstream from the spinneret such that the inner or lumen diameter of the extruded and not yet precipitated configuration generally corresponds to the dimensions of the ring spinneret, from which the material is extruded.

A hollow fiber or capillary membrane can be formed by the precipitating solution acting in an outward direction on the polymer solution after issuing from the wet-spinning spinneret. The precipitation can be generally terminated before the hollow fiber gets as far as the surface of a rinsing bath that dissolves out the organic liquid contained in the hollow fiber and finally fixes the fiber structure. When precipitation takes place, the first step can be for the inner face of the fiber-like structure to be coagulated so that a dense discriminating layer in the form of a barrier for molecules that are larger than about 60,000 Daltons can be formed. That is, anything smaller than albumin can pass through. With an increase in the distance from this barrier, there is an increasing dilution of the precipitation solution with the solvent contained within the spinning composition so that the precipitation properties become less vigorous in an outward direction. A consequence of this can be that a coarse-pored, sponge-like structure is formed in a radially outward direction which can function as a supporting layer for the radially inner membrane.

When precipitation takes place, a portion of the hydrophilic polymer (e.g., PVP) if used, (in addition to the polyarylether polymer—e.g., a sulfone polymer like polysulfone), can be dissolved out of the spinning composition, whereas a portion can be retained in the coagulated fiber. From about 5% to about 95% by weight of the second polymer (e.g., the hydrophilic polymer(s)) can be dissolved out of the spinning composition so that from about 95% (or more) to about 5% by weight of the hydrophilic polymer used can be left therein. As an example, a majority of the hydrophilic polymer, e.g., PVP, can remain in the fiber. For instance, 50 wt % to 99 wt %, 51 wt % to 90 wt %, 60 wt % to 80 wt % of the hydrophilic polymer can remain in the fiber. Pore formation can be caused by movement of the PVP toward the inner lumen of the fiber without necessarily being dissolved out.

Draft refers to exit speed of the fiber-like structure from the ring spinneret as differing from (and is usually greater than) the speed at which the precipitated fiber is drawn off. Draft can cause stretching of the fiber structure as it issues from the ring spinneret during the fiber precipitation in such a way that the pores formed are stretched in the draft direction and for this reason can be permanently deformed. Fiber spun with a draft can have an ultrafiltration rate that can be either significantly lower or higher than with a fiber produced without such spinneret draft. The speed of emergence of the spinning composition from the spinneret and the drawing off speed of the fiber produced can be made generally the same to avoid spinning draft to reduce possible occurrence of pore deformations or formation of constrictions of the fiber lumen and thinning out of the fiber wall. As an option, the pumping rate of the precipitative fiber can be slower than the draw rate from the spinneret, which causes a drawing of the fiber, which reduces the diameter of the fiber. This drawing or pulling can optionally be used to form the fiber.

A further spinning parameter is the distance between the surface of the rinsing bath and the spinneret, because such distance is controlling for the precipitation time at a given speed of downward motion, that is to say, a given speed of extrusion. This distance can be dependent on the viscosity, the weight and the precipitation rate of the fiber. The distance between the spinneret and the precipitating bath can be set at a distance, for example, of no greater than about one meter. After precipitation, the coagulated fiber can be rinsed in a bath that normally contains water and in which the hollow fiber is kept, such as for about 3 to 10 minutes or more, for washing out the dissolved organic constituents and for fixing the microporous structure of the fiber. After that, the fiber can be passed through a hot drying zone. The hollow fiber produced can have a thin radially inner barrier layer on the inside surface which is adjacent an outer open-pore support layer. For example, where the hydrophilic polymer is included in the spinning solutions, the inner face fiber manufactured can contain a dense barrier layer which has a pore diameter, for example, of from about 0.0005 μm to about 0.1 μm, or other values. Adjacent this inner barrier layer on the outside thereof, there can be a foam-like supporting structure.

The hollow fiber can be texturized in order to improve the exchange properties thereof. After this, the fiber so produced can be handled in conventional manners, for example, by winding onto a bobbin or wheel, cutting the fibers to a desired length, and/or used in manufacture of dialyzers from the cut fiber in conventional manners. The spin mass can be extruded or cast to form sheet forms. Methods and equipment suitable for casting membrane films or sheets using the reactor solutions of the present invention include those, for example, such as described in the U.S. Pat. No. 3,691,068. The spin mass also can be coated and solidified in place as a continuous or discontinuous coating or film on a substrate surface (e.g., woven or non-woven).

As a specific example of the present invention, a method of spinning a polyarylether polymer fiber (e.g., a sulfone polymer fiber like a polysulfone fiber) is provided that includes the steps of providing a spin mass containing at least one polyarylether polymer (e.g., sulfone polymer(s) like polysulfone) and at least one solvent (e.g., organic solvent); providing a bore fluid containing at least one solvent, such as at least one aqueous solvent and at least one organic solvent; combining the spin mass and bore fluid to form a polyarylether polymer fiber (e.g., a sulfone polymer fiber like a polysulfone fiber). In this method, the spin mass and/or bore fluid contains one or more additives of the present invention. The spin mass can have less than 10 wt % low MW PVP by weight of the spin mass and/or the total PVP content in the spin mass can be less than 10 wt % low MW PVP. The bore fluid can have less than 10 wt % low MW PVP by weight of the bore fluid. The low MW PVP can be considered to have a weight average molecular weight of less than about 100 kDa (or a K value of 36 or less, such as 1 to 35 or 30 or less or 25 or less). The spin mass (or the total PVP content in the spin mass), the bore fluid, or both can have less than about 7.5 wt %, less than about 5 wt %, less than about 2.5 wt %, less than about 1 wt %, less than 0.2 wt %, or less than about 0.001 wt % low MW PVP. For each of these ranges, the lower limit can be 0.0001 wt %. The spin mass can contain dimethylacetamide (DMAC) (and/or a different solvent) and/or the bore fluid can contain DMAC (and/or a different solvent) and water.

When PVP is used in preparing the spin mass, as an option, it is preferred to add PVP in powder form in preparing the spin mass. This permits better control of the spin mass solution.

The spin masses of the present invention preferably contain low amounts of water. For instance, the spin masses can contain 4 wt % water or less (based on the weight of the spin mass), such as 0.001 wt % to 4 wt %, 0.01 wt % to 4 wt %, 0.1 wt % to 4 wt %, 0.5 wt % to 3.5 wt %, 0.75 wt % to 3 wt %, 0.9 wt % to 1.7 wt %, and the like.

The spin masses once formed and prior to being used are preferably clear and are not cloudy. In other words, the spin mass solution is transparent and not opaque. The spin mass solution is preferably as clear as water (though a different color than water).

As one option, using one or more additives as described herein, the method of making a polymeric fiber, such as a polyarylether polymer fiber (e.g., a sulfone polymer fiber like a polysulfone fiber), is made possible with using only one type of PVP (meaning a low or medium or high MW PVP or using one PVP having a designated K value or K value range, such as K50, or K45-55 or K40-55) and/or avoiding the use of low and/or medium molecular weight. PVP and/or high molecular weight PVP in the spin mass and/or bore fluid, and/or using only one type of PVP (e.g., using only a low MW PVP, using only a medium MW PVP, or using only a high MW PVP) in the spin mass and/or bore fluid. The reference to molecular weight herein and throughout is a reference to weight average molecular weight in Daltons. PVP, especially when making polysulfone fibers, is a preferred ingredient used in the spin mass, and it was believed that the presence of very small amounts of certain types of PVP, especially a combination of different MWs of PVPs, were useful in obtaining desirable properties for the hollow fibers especially for use in membranes for dialyzers. It would beneficial to be able to reduce the number (of types) of PVPs present in methods to make polymeric fibers, such as polysulfone fibers, and/or it would be beneficial to be able to reduce the amount of certain types of PVPs present in methods to make polymeric fibers and, at the same time, use a low amount of water, for instance, in the spin mass (e.g., 4 wt % or less). The additives of the present invention, as described herein, can provide one or more of these advantages.

PVP can be characterized by K values. The K values assigned to various grades of PVP represent a function of the average molecular weight, the degree of polymerization, and the intrinsic viscosity. The K values as used herein (for the present invention) are derived from viscosity measurements and are calculated according to the following formula:

$$\text{Log Mw}=2.82*\text{Log K}+0.594$$

While the above is considered to be more accurate with regards to determining K value, some literature provides that the weight average molecular weight of the polyvinylpyrrolidone can be determined by a K value using the following equation, also illustrated graphically in FIG. 15 of the BASF Technical Information literature entitled "Kollidon: Polyvinylpyrrolidone for the Pharmaceutical Industry," wherein MW is the weight average molecular weight, K is the K value, and a is exp (1.055495):

$$MW=a*K^{2.97159}$$

More specific examples of the ability to control and/or reduce the presence of PVP in methods to make polymeric fibers are provided below. Examples of low MW PVP include, but are not limited to, at least one of PVP K12, PVP K30, or any PVP with a K value (or K value range) of from 1 to 36, or any combinations thereof. As an option, the spin mass and/or the bore fluid includes no low MW PVP. As an option, with the present invention, the spin mass and/or the bore fluid can contain a single weight average MW species (weight average of species) of PVP (e.g., a single PVP K value or single PVP K grade). As an option, the spin mass and/or the bore fluid contains a medium MW PVP. The spin mass can contain less than 25 wt % medium MW PVP by weight of the total PVP present in the spin mass (e.g., 0.001 wt % to 24 wt %, 1 wt % to 10 wt %, 1 wt % to 5 wt %, 0.01 wt % to 3 wt %, 0.01 wt % to 1 wt %). The bore fluid can contain less than 25 wt % medium MW PVP by weight of the bore fluid (e.g., 0.001 wt % to 24 wt %, 1 wt % to 10 wt %, 1 wt % to 5 wt %, 0.01 wt % to 3 wt %, 0.01 wt % to 1 wt %). The medium MW PVP can have a weight average molecular weight of from 100 kDa to less than 900 kDa, such about 100 kDa to 850 kDa (or a K value of K37 to K79). As an option, the spin mass (that is, the total PVP content in the spin mass based on the total weight percent of PVP), the bore fluid, or both can have less than about 90 wt %, less than about 75 wt %, less than about 50 wt %, less than about 25 wt %, less than about 15 wt %, less than about 7.5 wt %, less than about 5 wt %, less than about 2.5 wt %, less than about 1 wt %, less than 0.1 wt %, or less than about 0.001 wt % medium MW PVP, by weight of the spin mass (based on the total weight percent of PVP present in the spin mass) and/or bore fluid. For these ranges, a lower limit can be 0.0001 wt %. The medium MW PVP can be or include PVP having a K value or K value range of from K37 to 79, such as from K40 to K75, K45 to K70, K45 to K65, K45 to K60, K45 to K55 or any individual K value in these ranges. K values of K45 to K55 are especially effective in the present invention. As an option, the spin mass and/or the bore fluid can contain a high MW PVP; wherein the spin mass (based on the total weight of the spin mass or based on the total weight percent of PVP present in the spin mass) contains less than 25 wt % high MW PVP by weight of the spin mass; and/or wherein the bore fluid contains less than 25 wt % high MW PVP by weight of the bore fluid; and wherein the high MW PVP has a weight average molecular weight of equal to or greater than 900 kDa (or a K value of K80 or higher). As an option, the spin mass (based on the total weight of the spin mass or based on the total weight percent of PVP present in the spin mass), the bore fluid, or both has less than about 90 wt %, less than about 75 wt %, less than about 50 wt %, less than about 25 wt %, less than about 15 wt %, less than about 7.5 wt %, less than about 5 wt %, less than about 2.5 wt %, less than about 1 wt %, less than 0.1 wt %, or less than about 0.001 wt % high MW PVP. For these ranges, a lower limit can be 0.0001 wt %. The high MW PVP can have a K value or K value range of from K80 to K105 or higher, such as from K80 to K90, K81 to K88 or K81 to K86 or any individual K value in these ranges. The high MW PVP used in the examples had a weight average MW~900,000 Da.

As one example, the spin mass formulation can contain less than 25 wt % high molecular weight PVP by weight of the total PVP content in the spin mass. More specific examples of these amounts can be of the ranges set forth immediately above this paragraph. The spin mass (by weight of the spin mass or by weight of the total PVP content) and/or bore fluid can have less than about 10 wt % high molecular weight PVP, such as less than 0.001 wt % high molecular weight PVP or 0 wt % high molecular weight PVP. As an option, the spin mass, with regard to PVP components, can contain some or exclusively a medium molecular weight PVP, such as a PVP having an average molecular weight of from about 50,000 Da to about 310,000 Da, for instance, from about 200,000 Da to 300,000 Da, or from about 215,000 Da to about 285,000 Da, and the like. The medium molecular weight PVP can be a PVP having a K value of from K37 to K79, such as from K40 to K75, K45 to K70, K45 to K65, K40 to K55, K45 to K60, K45 to K55 or any individual K value in these ranges and can be or include PVP K40, K41, K42, K43, K44, K45, K46, K47, K48, K49, K50, K51, K52, K53, K54, and/or K55. It has been found that the use of a medium molecular weight PVP (or more than one type of medium MW PVP) can replace partially or entirely a high molecular weight PVP component and/or replace partially or entirely a low molecular weight PVP component, and yet achieve comparable, if not better, performance properties with regard to the fiber and, in the present invention, this can be achieved with a water content of 4 wt % or less in the spin mass. The PVP component can be a medium molecular weight PVP that comprises 100 wt %, 10 wt % to 100 wt %, 20 wt % to 100 wt %, 30 wt % to 100 wt %, 40 wt % to 100 wt %, 50 wt % to 100 wt %, 60 wt % to 100 wt %, 75 wt % or more, 85 wt % or more of all PVP containing components in the bore fluid and/or spin mass or both (based on the total PVP content in the spin mass). Unless stated otherwise, the reference to molecular weight is a reference to weight average molecular weight throughout the present application.

The present invention also relates to a polyarylether polymer fiber comprising at least one polyarylether polymer and at least one polyvinylpyrrolidone (PVP), wherein said at least one PVP comprising at least one medium weight PVP having a K value of from 40 to 55 or 45 to 55. The polyarylether polymer fiber can have a medium molecular weight PVP with a K value of from 47 to 53. The medium molecular weight PVP can be present in an amount of from about 0.1 wt % to 15 wt %, based on the weight of the polyarylether polymer fiber, such as from about 1 wt % to 10 wt %, based on the weight of the polyarylether polymer fiber, or from about 3 wt % to 8 wt %, based on the weight of the polyarylether polymer fiber. The polyarylether polymer fiber can be a sulfone polymer fiber. The polyarylether polymer fiber can be a polysulfone fiber. The PVP present in the fiber can be considered dispersed or distributed in the polyarylether polymer, either in a uniform or non-uniform manner. The PVP can be dispersed or distributed such that the PVP concentration is higher on the outer surface area of the fiber (e.g., the weight concentration of PVP can be 1% to 100% higher in the outer surface area of the fiber).

The polyarylether polymer fiber can further comprise 0 wt % to 15 wt % of at least one low molecular weight PVP having a K value of 36 or less or a K value of 30 or less, such as 0 wt % to 10 wt %, or 0 to 5 wt %, from 0 wt % to 0.3 wt %, from 0 wt % to 0.2 wt %, from 0 wt % to 0.1 wt %, or from 0 wt % to 1 wt %. With the polyarylether polymer fiber of the present invention, the PVP can further comprise 0 wt % of any low molecular weight PVP having a K value of 36 or less, such as 30 or less.

The polyarylether polymer fiber of the present invention can further comprise from 0 wt % to 15 wt % of at least one high molecular weight PVP having a K value of 80 or higher, such as 0 wt % to 10 wt % of at least one high molecular weight PVP having a K value of 80 or higher, or from 0 wt % to 0.3 wt %, from 0 wt % to 0.2 wt %, from 0 wt % to 0.1 wt %, 0 wt % to 5 wt % of at least one high molecular weight PVP having a K value of 80 or higher, or 0 wt % to 1 wt % of at least one high molecular weight PVP having a K value of 80 or higher, or 0 wt % of any high molecular weight PVP having a K value of 80 or higher.

The polyarylether polymer fiber of the present invention can be in the absence of a PVP with a K value of 44 or less, 42 or less, 40 or less, 39 or less, or 30 or less (e.g., K1 to K40).

The polyarylether polymer fiber of the present invention can be in the absence of a PVP with a K value of 56 or higher, or 60 or higher, or 70 or higher, or 80 or higher, or 90 or higher (e.g., K56 to K120).

The polyarylether polymer fiber of the present invention can have one or more of the following properties:

a) a zeta (streaming) potential of from about −100 mV to about 100 mV;

b) an ultrafiltration constant ($K_{UF}$) of from about 100 ml/hr*mmHg*$m^2$ to about 1000 ml/hr*mmHg*$m^2$;

c) an albumin sieving coefficient of from about 0.001% to about 1%;

d) a vitamin $B_{12}$ clearance rate of from about 150 ml/min to about 250 ml/min at $Q_b/Q_a$=300/500 ml/min;

e) a creatinine clearance rate of from about 50 ml/min of creatinine to about 290 ml/min of creatinine with $Q_b/Q_d$=300/500 ml/min;

f) a sodium clearance rate of from about 30 ml/min of sodium to about 300 ml/min of sodium with $Q_b/Q_d$=300/500 ml/min;

g) a beta-2-microglobulin clearance rate of from about 10 ml/min of beta-2-microglobulin to about 250 ml/min of beta-2-microglobulin with $Q_b/Q_d$=300/500 ml/min;

h) a middle molecule (lysozyme) clearance rate of from about 50 ml/min of lysozyme to about 250 ml/min of lysozyme with $Q_b/Q_d$=300/500 ml/min; and/or i) a water absorption capacity of from 1% to 10%.

As an option, all of properties a) through i) can be present, or two or more, three or more, four or more, five or more, six or more, seven or more, or eight or more. The polyarylether polymer fiber can have the following fiber geometry: an outside diameter of from about 100 μm to about 0.5 mm, an interior diameter of from about 100 μm to about 0.5 mm, a thickness of from about 0.001 μm to about 250, and a length of from about 0.01 μm to about 1 m. The polyarylether polymer fiber can have a tensile strength of from about 0.1 to about 10 MPa. It is to be understood that the fiber and performance properties described earlier and below can be present in any of the fibers described in the present invention, including the mentioned sub-ranges and the like.

Another feature of the present invention is a polyarylether polymer fiber (e.g., a sulfone polymer fiber like a polysulfone fiber) produced by a method of the present invention or any other suitable method. The polyarylether polymer fiber (e.g., a sulfone polymer fiber like a polysulfone fiber) produced can have a zeta (streaming) potential of from about −500 mV to about 500 mV, from about −250 mV to about 250 mV, from about −100 mV to about 100 mV, from about −25 mV to about 25 mV, or from about −10 mV to about 10 mV. The water permeability of membranes formed from the fibers can be evaluated by determining the ultrafiltration coefficient ($K_{UF}$). The $K_{UF}$ is defined as the number of milliliters of fluid per hour that will be transferred across the membrane per mm Hg pressure gradient across the membrane. Hollow fiber membranes produced can have a water permeability ($K_{UF}$ per area), for example, of from about 1 to about 1000 ml/hr·mm Hg·$m^2$ or higher, from about 10 to about 50 ml/hr·mm Hg·$m^2$, from about 25 to about 1000 ml/hr·mm Hg·$m^{2,}$ from about 30 to about 900 ml/hr·mm Hg·$m^2$, from about 100 to about 600 ml/hr·mm Hg·$m^2$, or from about 150 to about 250 ml/hr·mm Hg·$m^2$, greater than about 750 ml/hr·mm Hg·$m^2$, or other values.

The hollow fibers of the present invention can have a water absorption capacity, for example, of from about 1% to about 10% by weight, or from about 2% to about 9% by weight, or from about 3% to about 8% by weight, or other values. The water absorption capacity can be ascertained in the following manner. Water-vapor saturated air is passed at room temperature (25° C.) through a dialyzer fitted with the hollow fibers and in a dry condition. In this respect, air is introduced under pressure into a water bath and after saturation with water vapor is run into the dialyzer. As soon as a steady state has been reached, it is then possible for the water absorption capacity to be measured.

The polyarylether polymer fiber (e.g., a sulfone polymer fiber like a polysulfone fiber) of the present invention can be designed with a variety of sieving/clearance properties. Clearance data can be measured on hollow fibers of the present invention, for example, according to DIN 58,352. The polyarylether polymer fiber (e.g., a sulfone polymer fiber like a polysulfone fiber) can have an albumin sieving coefficient of less than about 20%, from about 0.001% to about 1%, from about 0.01% to about 0.75%, from about 0.1% to about 0.5%, from about 0.05% to about 10%, or more than 0.5%. For example, the maximum blood flow for a patient can be from about 450 ml/min to about 500 ml/min. The polyarylether polymer fiber (e.g., a sulfone polymer fiber like a polysulfone fiber) can have an albumin sieving coefficient less than about 20% and clearance rate less than 100% of the blood side flow rate. The polyarylether polymer fiber (e.g., a sulfone polymer fiber like a polysulfone fiber) into a dialyzer, for example, of about 1.4 $m^2$ area, can have a vitamin $B_{12}$ clearance rate of from about 1 ml/min of vitamin $B_{12}$ to about 300 ml/min of vitamin $B_{12}$, from about 10 ml/min of vitamin $B_{12}$ to about 300 ml/min of vitamin $B_{12}$, from about 150 ml/min of vitamin $B_{12}$ to about 250 ml/min of vitamin $B_{12}$, or from about 75 ml/min of vitamin $B_{12}$ to about 150 ml/min of vitamin $B_{12}$ (e.g., each at $Q_b/Q_d$=300/500 ml/min). The vitamin $B_{12}$ clearance rate can be about 250 ml/min at $Q_b/Q_d$=300/500 ml/min. The polysulfone-based fiber fabricated into a dialyzer, for example, of about 1.4 $m^2$ area, can have a middle molecule (lysozyme) clearance rate of from about 1 ml/min of lysozyme to about 300 ml/min of lysozyme, from about 10 ml/min of lysozyme to about 300 ml/min of lysozyme, from about 50 ml/min of lysozyme to about 250 ml/min of lysozyme, or from about 75 ml/min of lysozyme to about 150 ml/min of lysozyme. The lysozyme clearance rate can be about 92 ml/min. Any of the clearance rates can be stated in respect to $Q_b/Q_d$=300/500 ml/min.

The polyarylether polymer fiber (e.g., a sulfone polymer fiber like a polysulfone fiber) fabricated into a dialyzer, for example, of about 1.4 $m^2$ area, can have a creatinine clearance rate of from about 1 ml/min of creatinine to about 300 ml/min of creatinine, from about 10 ml/min creatinine to about 300 ml/min of creatinine, from about 50 ml/min of creatinine to about 290 ml/min of creatinine, or from about 75 ml/min of creatinine to about 150 ml/min of creatinine. The polyarylether polymer fiber (e.g., a sulfone polymer fiber like a polysulfone fiber) fabricated into a dialyzer, for example, of about 1.4 $m^2$ area, can have a beta-2-microglobulin clearance rate of from about 1 ml/min of beta-2-microglobulin to about 300 ml/min of beta-2-microglobulin, from about 10 ml/min of beta-2-microglobulin to about 300 ml/min of beta-2-microglobulin, from about 20 ml/min of beta-2-microglobulin to about 200 ml/min of beta-2-microglobulin, or from about 30 ml/min of beta-2-microglobulin to about 150 ml/min of beta-2-microglobulin. Any of the clearance rates can be stated in respect to $Q_b/Q_d$=300/500 ml/min Sodium clearance can be ascertained with aqueous solutions for hollow fibers having 1.25 square meters of active surface area according to DIN 58,352 at a blood flow rate of about 280 mL/min. The clearance is equal to or lower than the blood flow or inlet flow. The sodium clearance of hollow fibers of the present invention can be, for example, from about 200 to about 300, or from about 250 to about 275, or from about 260 to about 280, or from about 265 to about 275, or other values. The polyarylether polymer fiber (e.g., a sulfone polymer fiber like a polysulfone fiber) can have a sodium clearance rate of from about 1 ml/min of sodium to about 300 ml/min of sodium, from about 10 ml/min of sodium to about 300 ml/min of sodium, from about 50 ml/min of sodium to about 290 ml/min of sodium, or from about 75 ml/min of sodium to about 295 ml/min of sodium. Any of the clearance rates can be stated in respect to $Q_b/Q_d$=300/500 ml/min. For example, a sodium clearance rate can be from about 30 ml/min of sodium to about 300 ml/min of sodium with $Q_b/Q_d$=300/500 ml/min.

The polyarylether polymer fiber (e.g., a sulfone polymer fiber like a polysulfone fiber) can have any fiber geometry. For instance, the fiber can have an outside diameter of from about 1 μm to about 1 mm, from about 5 μm to about 500 μm, from about 25 μm to about 250 μm, from about 15 μm to about 150 μm, or from about 50 μm to about 100 μm. For example, the outside diameter can be about 420 μm. The interior diameter can be from about 10 μm to about 1 mm, from about 25 μm to less than 500 μm, from about 50 μm to about 250 μm, from about 15 μm to about 150 μm, or from about 50 μm to about 100 μm. The wall thickness can be about from about 0.001 μm to less than 250 μm, from about 0.01 μm to about 100 μm, from about 0.1 μm to about 50 μm, from about 1 μm to about 25 μm, or from about 10 μm to about 20 μm. The fiber length can be from about 0.01 m to about 1 m, such as from about 25 cm to about 60 cm. The polyarylether polymer fiber (e.g., a sulfone polymer fiber like a polysulfone fiber) can have a tensile strength of from about 0.1 to about 10 MPa, from about 0.1 to about 5 MPa, from about 1 to about 5 MPa, from about 2 to about 8 MPa or more. Alternatively, tensile strength can be measured in g(force). For example, a fiber can withstand a g(force) of from about 1 g(force) to about 50 g(force), from about 5 g(force) about 40 g(force), from about 10 g(force) to about 30 g(force), less than about 2 g(force), or greater than about 50 g(force). For example, a fiber withstanding from about 18 g(force) to about 30 g(force), can have a wall thickness of about 15 μm or greater, an outside diameter of about 215 μm, and an interior diameter of about 185 μm. The interior diameter can be about 140 μm or higher for a fiber having an outer diameter of about 170 μm.

Membranes made from fibers of the present invention can have an excellent separation boundary. The sieving coefficients, for example, can be measured as 1.0 for Vitamin $B_{12}$, about 0.99 for inulin, from about 0.9 to about 1.0 for myoglobin, and under 0.01 for human albumin, or other values. The outer diameter of the hollow fibers, for example, can equal to about 0.1 to about 0.4 mm, whereas the thickness of the membrane can be about 10 to about 100 μm or from about 15 to about 50 μm. The hollow fibers produced with the present invention can approximate, at least in part, natural kidney function with respect to separating properties (e.g., sieving coefficient).

Membranes can be made with the fibers of the present invention. The membranes can be, for example, flat sheet or hollow fiber. The membranes can be used, for example, for dialysis membranes, ultrafiltration membranes, or microfiltration membranes. The dialysis membranes can be, for example, hemodialysis membranes. Semi-permeable membrane filtration can be used in the purification of proteins, including microfiltration and ultrafiltration. Microfiltration can be defined as a low pressure membrane filtration process which removes suspended solids and colloids generally larger than about 0.1 μm in diameter. Such processes can be used to separate particles or microbes such as cells, macrophage, and cellular debris. Ultrafiltration membranes are characterized by pore sizes which enable them to retain macromolecules having a molecular weight ranging from about 500 to about 1,000,000 Daltons. Ultrafiltration is a low-pressure membrane filtration process that can separate solutes, in some cases, up to about 0.1 μm in size, such as in a range of from about 0.01 μm to about 0.1 μm. Ultrafiltration can be used for concentrating proteins, and removing bacteria and viruses from a solution. Ultrafiltration also can be used for purification treatments, such as water purification. Dialysis membranes can be ultrafiltration membranes that contain biocompatible materials. When the membranes are hollow fibers, the hollow fibers can be microporous and capable of withstanding from about 100 psi to about 2,000 psi or more applied pressure without collapse.

A hollow fiber of the present invention that can be used for dialysis, such as hemodialysis, can have desirable properties including, for example, one or more of biocompatibility, high hydraulic permeability, a sharp separation characteristic, a satisfactory degree of mechanical strength to resist the pressures involved, and an excellent stability.

The present invention includes the following aspects/embodiments/features in any order and/or in any combination:

1. The present invention relates to a method of spinning a polyarylether polymer fiber comprising the steps of:

providing a spin mass comprising at least one polyarylether polymer and at least one organic solvent;

providing a bore fluid comprising at least one aqueous solvent and/or at least one organic solvent;

combining the spin mass and bore fluid to form the polyarylether polymer fiber;

wherein the spin mass or the bore fluid or both comprises at least one additive;

wherein the spin mass comprises less than 4 wt % low molecular weight (MW) PVP by weight of the spin mass;

wherein the bore fluid comprises less than 1 wt % low MW PVP by weight of the bore fluid; and wherein the low MW PVP has a weight average molecular weight of less than about 100 kDa (or a K value of K36 or less).

2. The method of any preceding or following embodiment/feature/aspect, wherein the spin mass comprises dimethylacetamide (DMAC), and the bore fluid comprises DMAC and water.

3. The method of any preceding or following embodiment/feature/aspect, wherein the at least one additive comprises at least one divalent salt, polyelectrolyte, glycerine, surfactant, vinylpyrrolidone/vinylacetate copolymer, vinylcaprolactam/vinylpyrrolidone/dimethylamino-propylmethacrylamide terpolymer, polyethylene glycol polyester copolymer, or poly(ethyleneimine)-PEI, or any combination thereof, in the spin mass.

4. The method of any preceding or following embodiment/feature/aspect, wherein the at least one additive comprises at least one polyelectrolyte in the bore fluid.

5. The method of any preceding or following embodiment/feature/aspect, wherein the spin mass comprises the at least one additive.

6. The method of any preceding or following embodiment/feature/aspect, wherein the at least one additive comprises at least one divalent salt, polyelectrolyte, glycerine, surfactant, vinylpyrrolidone/vinylacetate copolymer, vinylcaprolactam/vinylpyrrolidone/dimethylamino-propylmethacrylamide terpolymer, polyethylene glycol polyester copolymer, or poly(ethyleneimine)-PEI, or any combination thereof, in the bore fluid.

7. The method of any preceding or following embodiment/feature/aspect, wherein the bore fluid comprises the at least one additive.

8. The method of any preceding or following embodiment/feature/aspect, wherein the at least one additive comprises at least one divalent salt.

9. The method of any preceding or following embodiment/feature/aspect, wherein the low MW PVP has a K value of K35 or less.

10. The method of any preceding or following embodiment/feature/aspect, wherein the spin mass comprises no low MW PVP.

11. The method of any preceding or following embodiment/feature/aspect, wherein neither the spin mass nor bore fluid comprises a low MW PVP.

12. The method of any preceding or following embodiment/feature/aspect, wherein the spin mass comprises a single weight average MW species of PVP.

13. The method of any preceding or following embodiment/feature/aspect, wherein the spin mass comprises at least one medium MW PVP;

wherein the spin mass comprises less than 25 wt % medium MW PVP by weight of the spin mass;

wherein the bore fluid comprises less than 25 wt % medium MW PVP by weight of the bore fluid; and wherein the medium MW PVP has a weight average molecular weight of from about 100 kDa to 900 kDa (or a K value of K37 to K79).

14. The method of any preceding or following embodiment/feature/aspect, wherein the medium MW PVP has a K value of from 40 to 53.

15. The method of any preceding or following embodiment/feature/aspect, wherein at least one of the spin mass comprises a high MW PVP;

wherein the spin mass comprises less than 25 wt % high MW PVP by weight of the spin mass;

wherein the bore fluid comprises less than 25 wt % high MW PVP by weight of the bore fluid; and wherein the high MW PVP has a weight average molecular weight greater than 900 kDa (or a K value of K80 or higher).

16. The method of any preceding or following embodiment/feature/aspect, wherein the high MW PVP has a K value of from 80 to 100.

17. The method of any preceding or following embodiment/feature/aspect, wherein the at least one additive comprises at least one medium MW PVP.

18. The method of any preceding or following embodiment/feature/aspect, wherein the spin mass comprises from 0.1 wt % to 10 wt % of at least one medium MW PVP.

19. The method of any preceding or following embodiment/feature/aspect, wherein the bore fluid comprises 0 wt % PVP.

20. The method of any preceding or following embodiment/feature/aspect, wherein both the spin mass and the bore fluid comprise at least one additive.

21. The method of any preceding or following embodiment/feature/aspect, wherein the spin mass and the bore fluid comprise the at least one additive which is the same.

22. The method of any preceding or following embodiment/feature/aspect, wherein said at least one polyarylether polymer is at least one polysulfone.

23. The method of any preceding or following embodiment/feature/aspect, wherein said at least one polyarylether polymer is at least one sulfone polymer.

24. The method of any preceding or following embodiment/feature/aspect, wherein the fiber produced has a zeta (streaming) potential of from about −100 mV to about 100 mV.

25. The method of any preceding or following embodiment/feature/aspect, wherein the fiber produced has an ultrafiltration constant ($K_{UF}$) of from about 100 ml/hr*mmHg*$m^2$ to about 1000 ml/hr*mmHg*$m^2$.

26. The method of any preceding or following embodiment/feature/aspect, wherein the fiber produced has an albumin sieving coefficient of from about 0.001% to about 1%.

27. The method of any preceding or following embodiment/feature/aspect, wherein the fiber produced has a vitamin $B_{12}$ clearance rate of from about 150 ml/min to about 250 ml/min at $Q_b/Q_d$=300/500 ml/min.

28. The method of any preceding or following embodiment/feature/aspect, wherein the fiber produced has a creatinine clearance rate of from about 50 ml/min of creatinine to about 290 ml/min of creatinine with $Q_b/Q_d$=300/500 ml/min.

29. The method of any preceding or following embodiment/feature/aspect, wherein the fiber produced has a sodium clearance rate of from about 30 ml/min of sodium to about 300 ml/min of sodium with $Q_b/Q_d$=300/500 ml/min.

30. The method of any preceding or following embodiment/feature/aspect, wherein the fiber produced has a beta-2-microglobulin clearance rate of from about 50 ml/min of beta-2-microglobulin to about 250 ml/min of beta-2-microglobulin with $Q_b/Q_d$=300/500 ml/min.

31. The method of any preceding or following embodiment/feature/aspect, wherein the fiber produced has a middle molecule (lysozyme) clearance rate of from about 50 ml/min of lysozyme to about 250 ml/min of lysozyme with $Q_b/Q_d$=300/500 ml/min.

32. The method of any preceding or following embodiment/feature/aspect, wherein the fiber produced has the following fiber geometry: an outside diameter of from about 100 μm to about 0.5 mm, an interior diameter of from about 100 μm to less than 0.5 mm, a thickness of from about 0.001 μm to about 250, and a length of from about 0.01 m to about 1 m.

33. The method of any preceding or following embodiment/feature/aspect, wherein the fiber produced has a tensile strength of from about 0.1 to about 10 MPa.

34. A polymer fiber, such as a polysulfone-based fiber, produced by the method of any preceding or following embodiment/feature/aspect.

35. A method to form polymeric fibers comprising supplying a spin mass to a spinneret simultaneously with a bore fluid and casting polymeric fibers, wherein said spin mass comprises at least one polymer and at least one organic solvent and said bore fluid comprises at least one aqueous solvent and/or at least one organic solvent, and wherein said spin mass, bore fluid, or both further comprise at least one additive in a sufficient amount so as to achieve at least one of following properties as compared to the same polymeric fiber made in the same process, but without said additive being present:

a) sharpen the sieving curve for improved middle molecule removal;
b) remove larger uremic solutes from fluids;
c) improve middle molecule removal without a substantial increase in albumin leakage; and
d) fully or partially replace PVP (or a particular MW class of PVP) or a similar minority polymeric component present in a spin mass, and still obtain same or similar properties for the produced fiber.

36. The method of any preceding or following embodiment/feature/aspect, wherein said polymer is a polyarylether.

37. The method of any preceding or following embodiment/feature/aspect, wherein said polymer is a polysulfone and said organic solvent in said spin mass is dimethylacetamide.

38. The method of any preceding or following embodiment/feature/aspect, wherein the spin mass comprises 0 wt % low molecular weight PVP, by weight of spin mass, wherein said additive comprises at least one medium molecular weight PVP in the spin mass, and 4 wt % or less water in the spin mass.

39. The method of any preceding or following embodiment/feature/aspect, wherein the at least one additive comprises at least one medium molecular weight PVP, and said medium molecular weight PVP is the only PVP type present in said spin mass, and 4 wt % or less water in the spin mass.

40. The method of any preceding or following embodiment/feature/aspect, wherein said medium molecular weight PVP has a weight average molecular weight of from 100,000 Da to 210,000 Da.

41. The method of any preceding or following embodiment/feature/aspect, wherein said medium molecular weight PVP has a weight average molecular weight of from 125,000 Da to 200,000 Da.

42. The method of any preceding or following embodiment/feature/aspect, wherein said medium molecular weight PVP comprises a PVP having a K value or range of from K40 to K75.

43. The method of any preceding or following embodiment/feature/aspect, wherein said spin mass comprises 0 wt % of said low molecular weight PVP and less than 25 wt % high molecular weight PVP.

44. The method of any preceding or following embodiment/feature/aspect, wherein said spin mass comprises 0 wt % of said low molecular weight PVP and less than 10 wt % high molecular weight PVP.

45. The method of any preceding or following embodiment/feature/aspect, wherein said spin mass comprises 0 wt % of said low molecular weight PVP and 0 wt % high molecular weight PVP.

46. A polyarylether polymer fiber comprising at least one polyarylether polymer and at least one polyvinylpyrrolidone (PVP), wherein said at least one PVP comprising at least one medium weight PVP having a K value of from 40 to 55.

47. The polyarylether polymer fiber of any preceding or following embodiment/feature/aspect, wherein said medium weight PVP has a K value of from 45 to 53.

48. The polyarylether polymer fiber of any preceding or following embodiment/feature/aspect, wherein said medium weight PVP is present in an amount of from about 0.1 wt % to 15 wt %, based on the weight of the polyarylether polymer fiber.

49. The polyarylether polymer fiber of any preceding or following embodiment/feature/aspect, wherein said medium weight PVP is present in an amount of from about 1 wt % to 10 wt %, based on the weight of the polyarylether polymer fiber.

50. The polyarylether polymer fiber of any preceding or following embodiment/feature/aspect, wherein said medium weight PVP is present in an amount of from about 3 wt % to 8 wt %, based on the weight of the polyarylether polymer fiber.

51. The polyarylether polymer fiber of any preceding or following embodiment/feature/aspect, wherein said PVP further comprises 0 wt % to 15 wt % of at least one low molecular weight PVP having a K value of 30 or less.

52. The polyarylether polymer fiber of any preceding or following embodiment/feature/aspect, wherein said PVP further comprises 0 wt % to 10 wt % of at least one low molecular weight PVP having a K value of 30 or less.

53. The polyarylether polymer fiber of any preceding or following embodiment/feature/aspect, wherein said PVP further comprises 0 wt % to 5 wt % of at least one low molecular weight PVP having a K value of 30 or less.

54. The polyarylether polymer fiber of any preceding or following embodiment/feature/aspect, wherein said PVP further comprises 0 wt % to 1 wt % of at least one low molecular weight PVP having a K value of 30 or less.

55. The polyarylether polymer fiber of any preceding or following embodiment/feature/aspect, wherein said PVP further comprises 0 wt % of any low molecular weight PVP having a K value of 30 or less.

56. The polyarylether polymer fiber of any preceding or following embodiment/feature/aspect, wherein said PVP further comprises 0 wt % to 15 wt % of at least one high molecular weight PVP having a K value of 80 or higher.

57. The polyarylether polymer fiber of any preceding or following embodiment/feature/aspect, wherein said PVP further comprises 0 wt % to 10 wt % of at least one high molecular weight PVP having a K value of 80 or higher.

58. The polyarylether polymer fiber of any preceding or following embodiment/feature/aspect, wherein said PVP further comprises 0 wt % to 5 wt % of at least one high molecular weight PVP having a K value of 80 or higher.

59. The polyarylether polymer fiber of any preceding or following embodiment/feature/aspect, wherein said PVP further comprises 0 wt % to 1 wt % of at least one high molecular weight PVP having a K value of 80 or higher.

60. The polyarylether polymer fiber of any preceding or following embodiment/feature/aspect, wherein said PVP further comprises 0 wt % of any high molecular weight PVP having a K value of 80 or higher.

61. The polyarylether polymer fiber of any preceding or following embodiment/feature/aspect, wherein said PVP is in the absence of a PVP with a K value of 40 or less.

62. The polyarylether polymer fiber of any preceding or following embodiment/feature/aspect, wherein said PVP is in the absence of a PVP with a K value of 56 or higher.

63. The polyarylether polymer fiber of any preceding or following embodiment/feature/aspect, wherein said polyarylether polymer fiber has one or more of the following properties:

a) a zeta (streaming) potential of from about −100 mV to about 100 mV;

b) an ultrafiltration constant ($K_{UF}$) of from about 100 ml/hr*mmHg*$m^2$ to about 1000 ml/hr*mmHg*$m^2$;

c) an albumin sieving coefficient of from about 0.001% to about 1%;

d) a vitamin $B_{12}$ clearance rate of from about 150 ml/min to about 250 ml/min at $Q_b/Q_d$=300/500 ml/min;

e) a creatinine clearance rate of from about 50 ml/min of creatinine to about 290 ml/min of creatinine with $Q_b/Q_d$=300/500 ml/min;

f) a sodium clearance rate of from about 30 ml/min of sodium to about 300 ml/min of sodium with $Q_b/Q_d$=300/500 ml/min;

g) a beta-2-microglobulin clearance rate of from about 50 ml/min of beta-2-microglobulin to about 250 ml/min of beta-2-microglobulin with $Q_b/Q_d$=300/500 ml/min;

h) a middle molecule (lysozyme) clearance rate of from about 50 ml/min of lysozyme to about 250 ml/min of lysozyme with $Q_b/Q_d$=300/500 ml/min;

i) a water absorption capacity of from 1% to 10%.

64. The polyarylether polymer fiber of any preceding or following embodiment/feature/aspect, wherein said polyarylether polymer fiber has each of properties a) through i).

65. The polyarylether polymer fiber of any preceding or following embodiment/feature/aspect, wherein said polyarylether polymer fiber has at least two of said properties.

66. The polyarylether polymer fiber of any preceding or following embodiment/feature/aspect, wherein said polyarylether polymer fiber has at least three of said properties.

67. The polyarylether polymer fiber of any preceding or following embodiment/feature/aspect, wherein said polyarylether polymer fiber has at least four of said properties.

68. The polyarylether polymer fiber of any preceding or following embodiment/feature/aspect, wherein said polyarylether polymer fiber has at least five of said properties.

69. The polyarylether polymer fiber of any preceding or following embodiment/feature/aspect, wherein the polyarylether polymer fiber has the following fiber geometry: an outside diameter of from about 100 μm to about 0.5 mm, an interior diameter of from about 100 μm to about 0.5 mm, a thickness of from about 0.001 μm to about 250, and a length of from about 0.01 m to about 1 m.

70. The polyarylether polymer fiber of any preceding or following embodiment/feature/aspect, wherein the polyarylether polymer fiber has a tensile strength of from about 0.1 to about 10 MPa.

71. The polyarylether polymer fiber of any preceding or following embodiment/feature/aspect, wherein said polyarylether polymer fiber is a sulfone polymer fiber.

72. The polyarylether polymer fiber of any preceding or following embodiment/feature/aspect, wherein said polyarylether polymer fiber is a polysulfone fiber.

73. The method of any preceding or following embodiment/feature/aspect, wherein said spin mass comprises 4 wt % or less water, based on the weight of the spin mass.

74. The method of any preceding or following embodiment/feature/aspect, wherein said spin mass comprises from about 0.001 wt % to 3 wt % water, based on the weight of the spin mass.

75. The method of any preceding or following embodiment/feature/aspect, wherein said spin mass is clear in appearance.

The present invention can include any combination of these various features or embodiments above and/or below as set forth in sentences and/or paragraphs. Any combination of disclosed features herein is considered part of the present invention and no limitation is intended with respect to combinable features.

The following examples further illustrate the invention but, of course, should not be construed as in any way limiting its scope.

Example 1

In accordance with the present invention, this example demonstrates the superior performance of the dialysis fiber of the present invention.

The properties of a membrane for use in dialyzers were studied from the standpoint of additions in the spin mass or in the bore fluid.

As set forth in Table 1 below, various experiments were run to determine the effects of using one or more additives in the spin mass or bore fluid. The polysulfone used was P-3500, which was a commercial product made by Solvay Specialty Polymer which has a MW in the range of about 75,000-86,000 Da. The high MW PVP was a polyvinylpyrrolidone from ISP Chemicals having a K value range of from about 81 to 86.

The polysulfone was used in each of the examples and was used in about the same amount, namely 720 g. In all but two of the examples, the high MW PVP was present in an amount of 180 g. In Fiber 1-5 and Fiber 1-6, instead of the high MW PVP, a lower molecular weight PVP additive having a K value of from about 46 to about 55 was used. In Fiber 1-5, extra water was also used in the spin mass for Fiber 1-5, whereas water was not used in the spin mass for Fiber 1-6. In each of these examples, the spin mass had from about 1.8 to 2.5 wt % water, based on total solution.

In more detail, in Fiber 1-1 and Fiber 1-2, the bore fluid was modified with an additive. In Fiber 1-1, the additive was a salt, namely calcium chloride; whereas in Fiber 1-2, the additive was a surfactant, namely Pluronic F108 surfactant.

In Fiber 1-3, the spin mass was modified with an additive, namely a salt, which was calcium chloride. In Fiber 1-4 and Fiber 1-7, the bore fluid was modified with polyelectrolyte. In Fiber 1-5 and Fiber 1-6, as indicated above, the spin mass was modified using a lower molecular weight PVP having a K value of from about 46 to about 55 and this PVP was used instead of the high MW PVP. In Fiber 1-7, the bore fluid was modified using the polyelectrolyte.

In each of the cases, the fibers were spun on a pilot line and for dialysis testing, the dialyzer was sterilized by e-beam.

to alter and preferably improve one or more properties, especially performance properties, of the fibers used in dialyzers.

Table 1 shows the components and properties of different dialysis fibers in accordance with the present invention.

TABLE 1

COMPONENTS AND PROPERTIES OF DIALYSIS FIBERS

| Component | Units | Control | Fiber 1-1 | Fiber 1-2 | Fiber 1-3 | Fiber 1-4 | Fiber 1-5 | Fiber 1-6 | Fiber 1-7 |
|---|---|---|---|---|---|---|---|---|---|
| P-3500 polysulfone* | g | 720 | 720 | 720 | 720 | 720 | 720 | 718.3 | 720 |
| High MW PVP* | g | 180 | 180 | 180 | 180 | 180 | 0 | 0 | 180 |
| Additive* | | None | | | $CaCl_2$ | | PVP K46-55 | PVP K46-55 | |
| Additive* | g | | | | 72 | | 238 | 238.2 | |
| Non-Solvent* | | | | | | | Water | | |
| Non-Solvent* | g | | | | | | 84 | | |
| DMAC* | g | 3550 | 3550 | 3550 | 3550 | 3550 | 3550 | 3550 | 3550 |
| Precip. Conc, water in DMAC (bore fluid) | | 42.5% | 43% + 4% $CaCl_2$ | 0.1% Pluronic F108 in 43% | 38% | 0.1% PEI in 42% | 41.5% | 43% | 0.05% Gafquat 440 in 42.5% |
| PERFORMANCE PROPERTIES | | | | | | | | | |
| Kuf/m$^2$ | ml/hr-mmHg-m$^2$ | 200 | 378 | 166 | 347 | 135 | 376 | 460 | 313 |
| Sodium Cl. | ml/min | 267 | 284 | 275 | 282 | 267 | 272 | 279 | 267 |
| Creatinine Cl. | ml/min | 242 | 259 | 253 | 259 | 245 | NA | NA | NA |
| B12 Cl. | ml/min | 157 | 193 | 174 | 187 | 168 | 175 | 189 | 167 |
| Plasma Albumin SC | % | 0.05 | 1 | 0.04 | 0.7 | 0.006 | ~0.2 | 0.07 | NA |
| Zeta Potential | mV | −12 | NA | −5 | −9 | +32 | −18 | NA | +33 |

*Spin mass
NA = Not Available

With regard to the properties, the performance properties were measured according to standard testing procedures, namely DIN EN1283. The ultra-filtration coefficient ($K_{uf}$) was determined using an aqueous solution instead of blood and was 10% of blood flow.

In each of Fiber 1-1 to Fiber 1-6, the spin mass had less than 4 wt % low molecular weight PVP by weight of the spin mass, and the bore fluid had less than 1 wt % low molecular weight PVP by weight of the bore fluid. In fact, in these examples, the spin mass and the bore fluid did not contain any intentional amounts of low molecular weight PVP.

As shown in the examples, the ultra-filtration coefficient ($K_{uf}$) was determined along with the zeta potential, the albumin sieving coefficient (albumin SC), the vitamin $B_{12}$ clearance rate, the sodium clearance rate, and the creatinine clearance rate.

For each of Fiber 1-1 to Fiber 1-7, the various performance properties, as set forth in Table 1, were considered acceptable. Further, as shown in Table 1, the additives had the ability to alter one or more performance properties. For instance, with regard to Fiber 1-7, the Gafquat polyelectrolyte in the bore fluid had the ability to alter significantly the zeta potential, which can be useful for purposes of changing the surface charge on the membrane. Thus, the examples confirmed that the bore fluid and/or spin mass can be successfully altered by using one or more additives in order As can be seen in Table 1, all Fibers of the present invention provided suitable one or more suitable performance properties. Fiber 1-5 and Fiber 1-6 showed that acceptable fibers can be made with just a medium molecular weight PVP, and without low MW PVP and without high MW PVP. The medium MW PVP had the ability to eliminate the need for other MW classes of PVP and served as an additive that provided numerous benefits to the fiber and fiber properties.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

[1. A method of forming a dialysis membrane comprising a plurality of polyarylether polymer fibers, wherein the polyarylether fibers are produced by a method comprising the steps of:

providing a spin mass comprising at least one polyarylether polymer and at least one organic solvent;

providing a bore fluid comprising at least one aqueous solvent and/or at least one organic solvent;

combining the spin mass and bore fluid to form the polyarylether polymer fibers;

and forming a dialysis membrane from a plurality of said polyarylether polymer fibers;

wherein the spin mass or the bore fluid or both comprises at least one additive;

wherein the spin mass comprises one medium molecular weight PVP having a K value of from K41 to K54 in an amount of from 0.1 wt % to 8 wt % and 0 wt % low molecular weight (MW) PVP and 0 wt % high molecular weight PVP by weight of the spin mass;

wherein the bore fluid comprises 0 wt % low MW PVP by weight of the bore fluid and 0 wt % high MW PVP; and wherein the low MW PVP has a weight average molecular weight of less than about 100 kDa.]

[2. The method of claim 1, wherein the at least one additive comprises at least one polyelectrolyte, glycerine, surfactant, vinylpyrrolidone/vinylacetate copolymer, vinylcaprolactam/vinylpyrrolidone/dimethylamino-propylmethacrylamide terpolymer, polyethylene glycol polyester copolymer, or poly(ethyleneimine)-PEI, or any combination thereof, in the spin mass, or the at least one additive comprises at least one polyelectrolyte, glycerine, surfactant, vinylpyrrolidone/vinylacetate copolymer, vinylcaprolactam/vinylpyrrolidone/dimethylamino-propylmethacrylamide terpolymer, polyethylene glycol polyester copolymer, or poly(ethyleneimine)-PEI, or any combination thereof, in the bore fluid.]

[3. The method of claim 1, wherein the at least one additive comprises at least one polyelectrolyte in the bore fluid.]

[4. The method of claim 1, wherein the bore fluid comprises less than 25 wt % medium MW PVP by weight of the bore fluid; and wherein the medium MW PVP has a weight average molecular weight of from about 100 kDa to 900 kDa.]

[5. The method of claim 1, wherein the at least one additive comprises at least one medium MW PVP.]

[6. A dialysis membrane produced by the method of claim 1.]

[7. The method of claim 1, wherein said at least one additive is present in a sufficient amount so as to achieve at least one of following properties as compared to the same polyarylether polymer fiber made in the same process, but without said additive being present:

a) sharpen the sieving curve for improved middle molecule removal;

b) remove larger uremic solutes from fluids;

c) improve middle molecule removal without a substantial increase in albumin leakage; and d) fully or partially replace PVP or a MW class of PVP or a similar minority polymeric component present in a spin mass, and still obtain same or similar properties for the produced polyarylether polymer fiber.]

[8. The method of claim 7, wherein said polyarylether polymer is a polysulfone and said organic solvent in said spin mass is dimethylacetamide.]

[9. The method of claim 1, wherein the spin mass comprises 4 wt % or less water in the spin mass.]

[10. The method of claim 1, wherein the at least one additive comprises at least one medium molecular weight PVP, and said medium molecular weight PVP is the only PVP type present in said spin mass, and 4 wt % or less water in the spin mass.]

[11. The method of claim 10, wherein said medium molecular weight PVP comprises a PVP having a K value of from K45 to K53.]

[12. A polyarylether polymer fiber comprising at least one polyarylether polymer and at least one polyvinylpyrrolidone (PVP), wherein said at least one PVP consisting of at least one medium weight PVP having a K value of from 45 to 53 and present in an amount of from 0.1 wt % to 8 wt % based on weight of said polyarylether polymer fiber, wherein a membrane formed from a plurality of the polyarylether polymer fibers has an ultrafiltration constant ($K_{UF}$) of from about 100 ml/hr*mmHg*$m^2$ to about 600 ml/hr*mmHg*$m^2$, and has an albumin sieving coefficient of from about 0.001% to about 0.5%.]

[13. The polyarylether polymer fiber of claim 12, wherein said medium weight PVP is present in an amount of from about 3 wt % to 8 wt %, based on the weight of the polyarylether polymer fiber.]

[14. The method of claim 1, wherein said spin mass comprises from about 0.001 wt % to 3 wt % water, based on the weight of the spin mass.]

[15. The polyarylether polymer fiber of claim 12, wherein the polyarylether polymer fiber has a vitamin $B_{12}$ clearance rate, according to DIN 58352, of from about 150 ml/min to about 250 ml/min at $Q_b/Q_d$:300/500 ml/min.]

[16. The polyarylether polymer fiber of claim 12, wherein the polyarylether polymer fiber has a creatinine clearance rate, according to DIN 58352, of from about 50 ml/min of creatinine to about 290 ml/min of creatinine with $Q_b/Q_d$: 300/500 ml/min.]

[17. The polyarylether polymer fiber of claim 12, wherein the polyarylether polymer fiber has a sodium clearance rate, according to DIN 58352, of from about 30 ml/min of sodium to about 300 ml/min of sodium with $Q_b/Q_d$:300/500 ml/min.]

[18. The polyarylether polymer fiber of claim 12, wherein the polyarylether polymer fiber has a beta-2-microglobulin clearance rate, according to DIN 58352, of from about 50 ml/min of beta-2-microglobulin to about 250 ml/min of beta-2-microglobulin with $Q_b/Q_d$:300/ 500 ml/min.]

[19. The polyarylether polymer fiber of claim 12, wherein the polyarylether polymer fiber has a middle molecule (lysozyme) clearance rate, according to DIN 58352, of from about 50 ml/min of lysozyme to about 250 ml/min of lysozyme with $Q_b/Q_d$:300/500 ml/min.]

[20. The polyarylether polymer fiber of claim 12, wherein the polyarylether polymer fiber has the following fiber geometry: an outside diameter of from about 100 μm to about 0.5 mm, an interior diameter of from about 100 μm to less than 0.5 mm, a thickness of from about 0.001 μm to about 250 μm, and a length of from about 0.01 m to about 1 m, and has a tensile strength of from about 0.1 to about 10 MPa.]

[21. A dialysis membrane comprising a plurality of polyarylether polymer fibers, said polyarylether polymer fibers comprising at least one polyarylether polymer and at least one polyvinylpyrrolidone (PVP), wherein said at least one PVP consisting of at least one medium weight PVP having a K value of from 45 to 53 and present in an amount of from 0.1 wt % to 8 wt % based on weight of said polyarylether polymer fibers, wherein the dialysis membrane has an ultrafiltration constant ($K_{UF}$) of from about 100 ml/hr*mmHg*$m^2$ to about 600 ml/hr*mmHg*$m^2$, and has an albumin sieving coefficient of from about 0.001% to about 0.5%.]

*22. A polyarylether polymer fiber formed from a solution comprising at least one polyarylether polymer, at least one polyvinylpyrrolidone (PVP), and a solvent, wherein said at least one PVP is at least one polyvinylpyrrolidone having a K value that is below 40 and at least one polyvinylpyrrolidone having a K value that is above 55;*

*wherein said polyarylether polymer fiber has a high sieving coefficient for molecules of molecular weight of about 65 kDa or less while maintaining a sieving coefficient of 1% or less for proteins with molecular weights greater than about 65 kDa, and*

*wherein said high sieving coefficient includes a sieving coefficient of 1.0 for Vitamin $B_{12}$, about 0.99 for inulin, from about 0.9 to about 1.0 for myoglobin, and an albumin sieving coefficient of from 0.001% to 1%.*

*23. A polyarylether polymer fiber formed from a solution comprising at least one polyarylether polymer in an amount of from 10 wt. % to 30 wt. %, from 1 to 10 wt. % of at least one hydrophilic polymer that is other than a polyvinylpyrrolidone having a K value of from 40 to 55, and a solvent,*

*wherein said polyarylether polymer fiber has a high sieving coefficient for molecules of molecular weight of about 65 kDa or less while maintaining a sieving coefficient of 1% or less for proteins with molecular weights greater than about 65 kDa, and*

*wherein said high sieving coefficient includes a sieving coefficient of 1.0 for Vitamin $B_{12}$, about 0.99 for inulin, from about 0.9 to about 1.0 for myoglobin, and an albumin sieving coefficient of from 0.001% to 1%.*

*24. A polyarylether polymer fiber formed from a solution comprising at least one polyarylether polymer, at least one polyvinylpyrrolidone (PVP), and a solvent, wherein said at least one PVP has a K value that is other than a K value of from 40 to 55;*

*wherein said polyarylether polymer fiber has a high sieving coefficient for molecules of molecular weight of about 65 kDa or less while maintaining a sieving coefficient of 1% or less for proteins with molecular weights greater than about 65 kDa, and*

*wherein said high sieving coefficient includes a sieving coefficient of 1.0 for Vitamin $B_{12}$, about 0.99 for inulin from about 0.9 to about 1.0 for myoglobin, and an albumin sieving coefficient of from 0.001% to 1%.*

*25. The polyarylether polymer fiber of claim 24, wherein the albumin sieving coefficient is from 0.001% to 0.75%.*

*26. The polyarylether polymer fiber of claim 24, wherein the albumin sieving coefficient is from 0.001% to 0.5%.*

*27. The polyarylether polymer fiber of claim 24, having a sodium clearance rate of from about 1 ml/min of sodium to about 300 ml/min of sodium at $O_b/O_d$=300/500 ml/min as measured according to DIN 58352 and based on the polyarylether polymer fiber being fabricated into a dialyzer having a 1.25 $m^2$ area.*

*28. The polyarylether polymer fiber of claim 24, having a sodium clearance rate of from about 30 ml/min of sodium to about 300 ml/min of sodium at $Q_b/O_d$=300/500 ml/min as measured according to DIN 58352 and based on the polyarylether polymer fiber being fabricated into a dialyzer having a 1.25 $m^2$ area.*

*29. The polyarylether polymer fiber of claim 24, having a sodium clearance of hollow fibers of from about 200 ml/min to about 300 ml/min at $Q_b/Q_d$=300/500 ml/min as measured according to DIN 58352 and based on the polyarylether polymer fiber being fabricated into a dialyzer having a 1.25 $m^2$ area.*

*30. The polyarylether polymer fiber of claim 24, having a sodium clearance of hollow fibers of from about 260 ml/min to about 280 ml/min at $Q_b/Q_d$=300/500 ml/min as measured according to DIN 58352 and based on the polyarylether polymer fiber being fabricated into a dialyzer having a 1.25 $m^2$ area.*

*31. The polyarylether polymer fiber of claim 24, having a lysozyme clearance rate of from about 1 ml/min of lysozyme to about 300 ml/min of lysozyme at $Q_b/Q_d$=300/500 ml/min as measured according to DIN 58352 and based on the polyarylether polymer fiber being fabricated into a dialyzer having a 1.4 $m^2$ area.*

*32. The polyarylether polymer fiber of claim 24, having a lysozyme clearance rate of from about 50 ml/min of lysozyme to about 250 ml/min of lysozyme at $Q_b/Q_d$=300/500 ml/min as measured according to DIN 58352 and based on the polyarylether polymer fiber being fabricated into a dialyzer having a 1.4 $m^2$ area.*

*33. The polyarylether polymer fiber of claim 24, having a lysozyme clearance rate of from about 75 ml/min of lysozyme to about 150 ml/min of lysozyme at $Q_b/Q_d$=300/500 ml/min as measured according to DIN 58352 and based on the polyarylether polymer fiber being fabricated into a dialyzer having a 1.4 $m^2$ area.*

*34. The polyarylether polymer fiber of claim 24, having an ultrafiltration constant ($K_{UF}$) of from about 1 ml/hr*mmHg to about 1000 ml/hr*mmHg as measured according to DIN EN1283 and based on the polyarylether polymer fiber being fabricated into a dialyzer having a 1 $m^2$ area.*

*35. The polyarylether polymer fiber of claim 24, having an ultrafiltration constant ($K_{UF}$) of from about 25 ml/hr*mmHg to about 100 ml/hr*mmHg as measured according to DIN EN1283 and based on the polyarylether polymer fiber being fabricated into a dialyzer having a 1 $m^2$ area.*

*36. The polyarylether polymer fiber of claim 24, having an ultrafiltration constant ($K_{UF}$) of from about 100 ml/hr*mmHg to about 600 ml/hr*mmHg as measured according to DIN EN1283 and based on the polyarylether polymer fiber being fabricated into a dialyzer having a 1 $m^2$ area.*

*37. The polyarylether polymer fiber of claim 24, having an ultrafiltration constant ($K_{UF}$) of from about 10 ml/hr*mmHg to about 50 ml/hr*mmHg as measured according to DIN EN1283 and based on the polyarylether polymer fiber being fabricated into a dialyzer having a 1 $m^2$ area.*

*38. The polyarylether polymer fiber of claim 24, having an ultrafiltration constant ($K_{UF}$) of from about 300 ml/hr*mmHg to about 500 ml/hr*mmHg as measured according to DIN EN1283 and based on the polyarylether polymer fiber being fabricated into a dialyzer having a 1 $m^2$ area.*

*39. The polyarylether polymer fiber of claim 24, having a vitamin $B_{12}$ clearance rate of from about 1 ml/min of vitamin $B_{12}$ to about 300 ml/min of vitamin $B_{12}$ at $Q_b/Q_d$=300/500 ml/min as measured according to DIN 58352 and based on the polyarylether polymer fiber being fabricated into a dialyzer having a 1.4 $m^2$ area.*

*40. The polyarylether polymer fiber of claim 24, having a vitamin $B_{12}$ clearance rate of from about 150 ml/min of*

*vitamin $B_{12}$ to about 250 ml/min of vitamin $B_{12}$ at $Q_b/Q_d$=300/500 ml/min as measured according to DIN 58352 and based on the polyarylether polymer fiber being fabricated into a dialyzer having a 1.4 $m^2$ area.*

*41. The polyarylether polymer fiber of claim 24, having a vitamin $B_{12}$ clearance rate of from about 75 ml/min of vitamin $B_{12}$ to about 300 ml/min of vitamin $B_{12}$ at $Q_b/Q_d$=300/500 ml/min as measured according to DIN 58352 and based on the polyarylether polymer fiber being fabricated into a dialyzer having a 1.4 $m^2$ area.*

*42. The polyarylether polymer fiber of claim 24, having a creatinine clearance rate of from about 1 ml/min of creatinine to about 300 ml/min of creatinine at $Q_b/Q_d$=300/500 ml/min as measured according to DIN 58352 and based on the polyarylether polymer fiber being fabricated into a dialyzer having a 1.4 $m^2$ area.*

*43. The polyarylether polymer fiber of claim 24, having a creatinine clearance rate of from about 50 ml/min of creatinine to about 290 ml/min of creatinine at $Q_b/Q_d$=300/500 ml/min as measured according to DIN 58352 and based on the polyarylether polymer fiber being fabricated into a dialyzer having a 1.4 $m^2$ area.*

*44. The polyarylether polymer fiber of claim 24, having a creatinine clearance rate of from about 75 ml/min of creatinine to about 150 ml/min of creatinine at $Q_b/Q_d$=300/500 ml/min as measured according to DIN 58352 and based on the polyarylether polymer fiber being fabricated into a dialyzer having a 1.4 $m^2$ area.*

*45. The polyarylether polymer fiber of claim 24, having a beta-2-microglobulin clearance rate of from about 1 ml/min of beta-2-microglobulin to about 300 ml/min of beta-2-microglobulin at $Q_b/Q_d$=300/500 ml/min as measured according to DIN 58352 and based on the polyarylether polymer fiber being fabricated into a dialyzer having a 1.4 $m^2$ area.*

*46. The polyarylether polymer fiber of claim 24, having a beta-2-microglobulin clearance rate of from about 10 ml/min of beta-2-microglobulin to about 250 ml/min of beta-2-microglobulin at $Q_b/Q_d$=300/500 ml/min as measured according to DIN 58352 and based on the polyarylether polymer fiber being fabricated into a dialyzer having a 1.4 $m^2$ area.*

*47. The polyarylether polymer fiber of claim 24, having a beta-2-microglobulin clearance rate of from about 30 ml/min of beta-2-microglobulin to about 150 ml/min of beta-2-microglobulin at $Q_b/Q_d$=300/500 ml/min as measured according to DIN 58352 and based on the polyarylether polymer fiber being fabricated into a dialyzer having a 1.4 $m^2$ area.*

*48. The polyarylether polymer fiber of claim 24, having a wall thickness of from about 0.001 μm to less than 250 μm.*

*49. The polyarylether polymer fiber of claim 24, having an ultrafiltration constant ($K_{UF}$) of from about 25 ml/hr*mmHg to about 100 ml/hr*mmHg as measured according to DIN EN1283 and based on the polyarylether polymer fiber being fabricated into a dialyzer having a 1 $m^2$ area;*

*a vitamin $B_{12}$ clearance rate of from about 150 ml/min to about 250 ml/min at $O_b/O_d$=300/500 ml/min as measured according to DIN EN1283 and based on the polyarylether polymer fiber being fabricated into a dialyzer having a 1.4 $m^2$ area;*

*a creatinine clearance rate of from about 150 ml/min of creatinine to about 290 ml/min of creatinine with $Q_b/Q_d$=300/500 ml/min as measured according to DIN EN1283 and based on the polyarylether polymer fiber being fabricated into a dialyzer having a 1.4 $m^2$ area;*

*said albumin sieving coefficient of from 0.001% to 0.01%;*

*and wherein the fiber has an interior diameter of from about 150 μm to about 250 μm and a wall thickness of from about 25 μm to about 50 μm.*

*50. The polyarylether polymer fiber of claim 24, having a wall thickness of from about 0.1 μm to 50 μm.*

*51. The polyarylether polymer fiber of claim 24, having a wall thickness of from about 25 μm to 50 μm.*

*52. The polyarylether polymer fiber of claim 24, having an interior diameter of from about 10 μm to about 1 mm.*

*53. The polyarylether polymer fiber of claim 24, having an interior diameter of from about 10 μm to about 250 μm.*

*54. The polyarylether polymer fiber of claim 24, having an interior diameter of from about 150 μm to about 250 μm.*

*55. The polyarylether polymer fiber of claim 24, having an interior diameter of about 185 μm.*

*56. The polyarylether polymer fiber of claim 24, wherein the at least one PVP comprises at least one polyvinylpyrrolidone having a K value of K36 or lower in an amount of from 4 wt % to 10 wt % based on said solution.*

*57. The polyarylether polymer fiber of claim 24, wherein the at least one PVP is at least one polyvinylpyrrolidone having a K value of K80 or higher.*

*58. The polyarylether polymer fiber of claim 24, wherein the at least one PVP is at least one polyvinylpyrrolidone having a K value of K36 or lower.*

*59. The polyarylether polymer fiber of claim 24, wherein the at least one PVP is at least one polyvinylpyrrolidone having a K value of from K80 to K105.*

*60. The polyarylether polymer fiber of claim 24, wherein the at least one PVP is at least one polyvinylpyrrolidone having a K value of K1 to K36.*

*61. The polyarylether polymer fiber of claim 24, wherein the at least one PVP is at least one polyvinylpyrrolidone having a K value of K36 or lower and at least one polyvinylpyrrolidone having a K value of K80 or higher.*

*62. The polyarylether polymer fiber of claim 24, wherein the polyarylether polymer fiber is microporous and has a pore diameter of from about 0.0005 μm to 0.1 μm.*

*63. The polyarylether polymer fiber of claim 24, wherein the polyarylether polymer fiber is microporous and is capable of withstanding from about 100 psi to about 2,000 psi applied pressure without collapse.*

*64. The polyarylether polymer fiber of claim 24, wherein the polyarylether polymer fiber exhibits a water absorption capacity of from 1% to 10%.*

*65. The polyarylether polymer fiber of claim 24, having a zeta potential of from about −500 mV to about 500 mV.*

*66. The polyarylether polymer fiber of claim 24, having a zeta potential of from −10 mV to about 10 mV.*

* * * * *